Patented May 12, 1953

2,638,482

UNITED STATES PATENT OFFICE 2,638,482

PRODUCTION OF CYCLOHEXANONE OXIME

Christoph Grundmann, Columbus, Ohio, assignor to Mathieson Chemical Corporation, a corporation of Virginia No Drawing. Application July 15, 1952, Serial No. 299,019. In Germany January 25, 1951

4 Claims. (Cl. 260—566)

My invention relates to a method for the manufacture of cyclohexanone oxime, a compound which is a valuable intermediate for the manufacture of superpolyamides.

It is known in the art that nitrocyclohexane can be reduced with stannous chloride in an acid medium to yield cyclohexanone oxime. It has also been proposed to prepare cyclohexanone oxime from nitrocyclohexane in an alkaline medium using reducing agents which develop nascent hydrogen, but the yield is very small. Also, cyclohexanone oxime has been obtained by the catalytic reduction of nitrocyclohexane with hydrogen in the presence of silver-containing catalysts which may also contain copper, chromium and zinc.

I have discovered that cyclohexanone oxime can be obtained in good yield from nitrocyclohexane by treatment with ammonia in the presence of a nickel catalyst. Under the same conditions, it is known that using hydrogen as a reducing agent cyclohexanone oxime is obtained only in traces.

The process which I have discovered is advantageously carried out under elevated conditions of temperature and pressure, the temperature preferably being within the range from about 100° C. to about 150° C., and is also advantageously carried out using a large molar excess of ammonia.

Nickel skeleton catalysts are particularly suitable for use in my process. Such catalysts are well known in the art, and can be prepared by alloying nickel with other elements which are removable by water, weak acids or alkali. An example of a catalyst of this type is that known as the "Raney" catalyst, which is prepared from a nickel-aluminum alloy by powdering the alloy and then leaching out the aluminum with caustic soda or sodium carbonate solution. Other catalysts suitable for use in my process are those composed of nickel supported on a carrier, such as pumice, clay, aluminum oxide or kieselguhr. The nickel catalysts useful in my process may also contain minor amounts, based upon the nickel content, of cobalt, zinc, manganese, copper, alkaline earth metals or alkali metals, such as sodium or potassium.

My process can also be carried out in the presence of organic oxygen-containing solvents or diluents which are miscible with water. Among such solvents are the lower saturated aliphatic monohydric alcohols, such as methanol, ethanol and isopropanol, dioxane, the monomethyl ether of monoethylene glycol, the monoethyl ether of monoethylene glycol, tetrahydrofurane, and so forth.

The following examples illustrate the practice of my invention, but are to be considered not limitative.

Example I 100 parts by weight of nitrocyclohexane and 10 parts by weight of a nickel skeleton catalyst containing a small amount of alkali are mixed in a high pressure autoclave with 250 parts by weight of liquid ammonia and shaken at 120–140° C. for a period of eight hours. The reaction mixture is then permitted to cool and the pressure is released in order to permit the excess of ammonia to evaporate, the residue is then diluted with 500 parts by weight of methanol and the mixture is filtered to remove the catalyst. The filtered mixture is then fractionally distilled under a vacuum to produce a fraction boiling at about 90–110° C. and about 9 mm. of mercury pressure. Upon cooling this fraction, cyclohexanone oxime having a melting point of 87–88° C. is produced in the amount of about 50 parts by weight.

In this example, the catalyst is prepared by treating 100 parts by weight of a nickel-aluminum alloy (30 per cent by weight of nickel and 70 per cent by weight of aluminum) with 500 parts by weight of a 20 per cent by weight aqueous solution of sodium hydroxide. After the first vigorous reaction has ceased, the mixture is heated for an hour on a steam bath. The mixture is then washed several times with distilled water by decantation until the wash water is neutral, and thereafter the mixture is washed three times with methanol in order to remove the water. The catalyst so prepared is used immediately.

Example II 50 parts by weight of nitrocyclohexane and 10 parts by weight of the catalyst used in Example I are diluted with 500 parts by weight of methanol which is saturated with ammonia. The mixture is then agitated in a high pressure autoclave at 110–120° C. for eight hours. Upon cooling, the reaction mixture is worked up as described in Example I to produce cyclohexanone oxime crystals having a melting point of 88° C. The oxime is produced in about a 65 per cent yield, based upon the amount of nitrocyclohexane consumed.

Example III

A mixture composed of 100 parts by weight of nitrocyclohexane, 10 parts by weight of a nickelchrome catalyst, 200 parts by weight of ethanol and 50 parts by weight of liquid ammonia is shaken in a high pressure autoclave for 12 hours at 100–130° C. After evaporation of the excess ammonia and filtration of the remaining mixture in order to remove the catalyst, the alcohol is then distilled off and the residue is distilled under a vacuum. The fraction boiling at 86–96° C. and at a pressure of 9 mm. of mercury solidifies to produce pure cyclohexanone oxime when cooled, the yield of the oxime being about 40 per cent, based upon the amount of monocyclohexane consumed.

In this example, the catalyst is prepared as follows:

100 parts by weight of finely powdered pumice is suspended in 1000 parts by weight of water in which 29 parts of $Ni(NO_3)_2 \cdot 6H_2O$ is dissolved. At 60° C., a solution of 15 parts by weight of $(NH_4)_2CrO_3$ and 100 parts by weight of water is added under constant and efficient stirring. After cooling, the precipitate is filtered off, washed with distilled water and dried in an oven at 110° C.

This application is a continuation-in-part of my copending application, Serial No. 250,033, filed October 5, 1951, now abandoned.

I claim:

1. A process for the manufacture of cyclohexanone oxime comprising reacting nitrocyclohexane and ammonia in the presence of a nickel catalyst under elevated conditions of temperature and pressure.

2. A process according to claim 1 in which the reaction temperature is within the range from about 100 to about 150° C.

3. A process according to claim 1 in which the catalyst is a nickel skeleton catalyst.

4. A process according to claim 1 in which the catalyst comprises nickel supported on a carrier.

CHRISTOPH GRUNDMANN.

References Cited in the file of this patent

UNITED STATES PATENTS

| Number | Name | Date |
|---|---|---|
| 2,377,071 | Castner | May 29, 1945 |
| 2,423,180 | Doumani et al. | July 1, 1947 |